(12) United States Patent
Evans, III et al.

(10) Patent No.: US 6,525,307 B1
(45) Date of Patent: Feb. 25, 2003

(54) INTEGRATED OPTICAL INTERROGATION OF MICRO-STRUCTURES

(75) Inventors: Boyd M. Evans, III, Oak Ridge, TN (US); Panagiotis G. Datskos, Knoxville, TN (US); Slobodan Rajic, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/397,552

(22) Filed: Sep. 16, 1999

(51) Int. Cl.[7] .................................................. G01J 1/04

(52) U.S. Cl. .............................. 250/227.16; 250/231.1; 356/519

(58) Field of Search ........................ 250/231.1, 227.14, 250/227.16, 227.21, 227.27, 227.3; 73/705; 356/519; 385/12, 13

(56) References Cited

U.S. PATENT DOCUMENTS

| | | | | |
|---|---|---|---|---|
| 5,275,053 A | * | 1/1994 | Wlodarczyk et al. | 73/705 |
| 5,633,494 A | * | 5/1997 | Danisch | 250/227.16 |
| 5,689,107 A | * | 11/1997 | Hsu | 250/231.1 |
| 5,891,747 A | * | 4/1999 | Farah | 438/31 |
| 5,982,009 A | * | 11/1999 | Hong et al. | 257/414 |
| 6,008,898 A | * | 12/1999 | Furstenau et al. | 356/519 |

OTHER PUBLICATIONS

Kenney, T.W., et al., "Micromachined Infrared Sensors Using Tunneling Displacement Transducers," *Rev. Sci Instrum.* 67 (1), Jan., 1996, pp. 112–128.
Datskos, P.G., et al., "Detection of 2–Mercaptoethanol Using Gold Coated Micromachined Cantilevers".
Amantea, R., et al., "Uncooled Infrared with Bi–material Capacitance Detectors".
Giessibl, F. J., et al., "Peozoresistive Cantilevers Utilized for Scanning Tunneling and Scanning Force Microscope in Ultrahigh Vacuum," *Rev. Sci Instrum* 65 (6) Jun. 1994, pp. 1923–1929.
de Groot, Peter, et al., "Synthetic Wavelength Stabilization for Two–Color Laser–Diode Interferometry," *Applied Optics*, vol. 30, No. 28, pp. 4026–4033, Oct. 1, 1991.
Downs, J.J., "A Proposed Design for an Optical Interferometer with Sub–Nanometric Resolution," *Nanotechnology I* (1990), pp. 27–30.
Fujita, "Application of Micromachining Technology to Optical Devices and Systems," *SPIE*, vol. 2882, pp. 2–11.
Hunsperger, *Integrated Optics: Theory and Technology*, Springer–Verlag, New York, 1984.
Koh, "Novel Integrated Optical I/O Couplers on MCMs using MEMS Techniques," *SPIE*, vol. 2686, pp. 121–129.
Moreau, et al., "Direct Printing Of Gratings On Sol–Gel Layers," *Optical Engineering*, vol. 37, No. 4, Apr. 1998, pp. 1130–1135.

(List continued on next page.)

*Primary Examiner*—Stephone Allen
(74) *Attorney, Agent, or Firm*—Kilpatrick Stockton, LLP (57) ABSTRACT

The invention is an integrated optical sensing element for detecting and measuring changes in position or deflection. A deflectable member, such as a microcantilever, is configured to receive a light beam. A waveguide, such as an optical waveguide or an optical fiber, is positioned to redirect light towards the deflectable member. The waveguide can be incorporated into the deflectable member or disposed adjacent to the deflectable member. Means for measuring the extent of position change or deflection of the deflectable member by receiving the light beam from the deflectable member, such as a photodetector or interferometer, receives the reflected light beam from the deflectable member. Changes in the light beam are correlated to the changes in position or deflection of the deflectable member. A plurality of deflectable members can be arranged in a matrix or an array to provide one or two-dimensional imaging or sensing capabilities.

13 Claims, 4 Drawing Sheets

OTHER PUBLICATIONS

Nishihara, et al., *Optical Integrated Circuits*, McGraw–Hill Book Company, 1985.

Ridgeway, et al., "Low–Cost Manufacturing Techniques for Passive Integrated–Optical Devices", *SPIE*, vol. 2686, pp. 108–114.

Smith, et al., "All–Silicon Waveguides and Bulk Etched Alignment Structures on (110) Silicon for Integrated Micro–Opto–Mechanical Systems," *SPIE*, vol. 2686, pp. 17–28.

Uenishi, et al., "AlGaAs/GaAs Micromachining for Monolithic Integration of Micromechanical Structures with Laser Diodes," *IEIC Trans. Electron*, vol. E78–C, No. 2, Feb. 1995, pp. 139–145.

Williams, et al., "Optical Ranging by Wavelength Multiplexed Interferometry," *J. Appl. Phys. 60 (6)*, pp. 1900–1903, Sep. 15, 1986.

Zappe, et al., "A Monolithic Optical Displacement Measurement Microsystem," *Micro Electromechanical Systems, Proc. $9^{th}$ Intl. Workshop*, 1996 IEEE, pp. 400–405.

* cited by examiner

INTEGRATED OPTICAL INTERROGATION OF MICRO-STRUCTURES

This invention was made with Government support under Contract No. DE-AC05-96OR22464 awarded by the U.S. Department of Energy to Lockheed Martin Energy Research Corp., and the Government has certain rights in this invention.

TECHNICAL FIELD

This invention relates generally to the field of microstructures, and more particularly to detecting and measuring position or deflection changes of a microstructure in a microsensor.

BACKGROUND OF THE INVENTION

Microsensors are being utilized more frequently as the desire to reduce the size of mechanical systems increases. Microsensors are becoming important detectors for military, industrial and consumer applications such as atomic force microscopy, chemical sensing, pressure or flow sensing, infrared detection, diaphragms, military safing and arming systems, and for use in accelerometers. In some cases, an array of microsensors is employed in applications such as infrared detection or chemical sensing.

A variety of microstructures can be used in a microsensor to detect and measure changes. For example, a microstructure such as a microcantilever can be used as a detector to produce a small deflection in the presence of a changing condition, whether that is the presence of a chemical or a particular type of radiation, or even changing temperature. Other types of microstructures can be used in microsensors for varying purposes, depending upon the property or characteristic to be measured.

A problem in using a microstructure such as a microcantilever as a detector is the measurement of small deflections of the microstructure. Capacitance methods, piezoresistance devices, and tunneling sensors are often used to measure small deflections of a microcantilever. For example, this can be accomplished by coupling an electrical circuit into the microcantilever which can be used to measure changes in resistance or capacitance with deflection.

However, the use of conventional systems and methods introduces unwanted influences or noise upon the microstructure in the microsensor, especially when multiple microcantilevers are used. For example, capacitance methods induce noise such as electrostatic forces onto the microcantilever being used in the microsensor. In another example, piezoresistance devices induce noise such as resistive heating onto the microcantilever being used in the microsensor.

Unwanted influences on the microstructure also affect the range and sensitivity of the microsensor. The deflection response of a microcantilever is dependent upon the width and thickness of the microcantilever beam. For example, a relatively thin microcantilever beam could be affected by electrostatic forces or resistive heating introduced by conventional systems and methods. In another example, piezoelectric methods lack the precise positioning resolution.

Laser measurement methods as used with conventional atomic force microscopes offer accurate methods of measuring small deflections of microcantilevers. However, these methods are difficult to transfer to a system requiring an array of microcantilevers. When these methods are used with an array of microcantilevers, the bulk and size of the lasers offset any reduction in size gained by the use of microcantilevers.

Microstructures can be constructed with a layer thickness of 2 $\mu$m or less. The alignment of these relatively thin microstructures in a microsensor can be difficult and time consuming. Therefore, the costs to fabricate microsensors with thin microstructures can be very expensive.

Thus, there is a need in the art for an improved apparatus and method for detecting a change in the position or deflection of a microstructure in a microsensor.

There is yet a further need in the art for an apparatus and method that minimizes unwanted influences in detecting and measuring changes in the position or deflection of a microstructure in a microsensor.

There is yet a further need in the art for an apparatus and method that increases the range and sensitivity of detecting and measuring changes in the position or deflection of a microstructure in a microsensor.

There is yet a further need in the art for an apparatus and method that decreases the cost of fabricating and aligning thin microstructures for microsensors.

SUMMARY OF THE INVENTION

The present invention meets the needs described above in an integrated optical sensing element. The integrated optical sensing element provides an improved apparatus and method for detecting a change in the position or deflection of a microstructure in a microsensor. The integrated optical sensing element minimizes unwanted influences in detecting and measuring changes in the position or deflection of a microstructure in a microsensor. Furthermore, the integrated optical sensing element increases the range and sensitivity of detecting and measuring changes in the position or deflection of a microstructure in a microsensor. And, the integrated optical sensing element decreases the cost of fabricating and aligning thin microstructures for microsensors.

Generally described, the invention is an integrated optical sensing element for detecting changes in position or deflection. The integrated optical sensing element includes a deflectable member, a waveguide, and a means for measuring the extent of position change or deflection of the deflectable member by receiving a light beam from the deflectable member. The deflectable member is configured to receive the light beam. The waveguide is configured to redirect the light beam in response to a change in position or deflection of the deflectable member. The means for measuring the extent of position change or deflection of the deflectable member receives the light beam from the deflectable member. Changes in the light beam are then correlated to changes in the position or deflection of the deflectable member.

According to an aspect of the invention, an integrated optical sensing element can be configured with a waveguide disposed to reflect the light beam. An integrated optical sensing element can be configured with a waveguide or optical waveguide adjacent to the deflectable member. When the light beam travels along the waveguide, the waveguide can reflect the light beam towards the deflectable member, and then the light beam can be reflected back towards the waveguide, optical waveguide, or a means for measuring the extent of position changed or deflection of the deflectable member.

If the light beam is reflected towards the means for measuring the extent of position change or deflection of the deflectable member, then the means can be photodetector or other sensing device that measures the relative power or intensity of the reflected light beam. The measured changes in relative power or intensity of the reflected light beam can be correlated to changes in the position or deflection of the deflectable member.

If the light beam is transmitted back through the waveguide or optical waveguide, then the means for measuring the extent of position changed or deflection of the deflectable member receives the reflected light beam. The means can be an interferometer, or other detecting device that measures the relative distance or displacement of the reflected light beam. The measured changes in relative distance or displacement of the reflected light beam can be correlated to changes in the position or deflection of the deflectable member.

According to yet another aspect of the invention, the waveguide is operatively associated with the deflectable member so as to deflect when the deflectable member deflects. An integrated optical sensing element can be configured as a compact, modular, monolithic microstructure with a waveguide or optical waveguide embedded in the deflectable member. The waveguide or optical waveguide can be configured to direct the light beam onto a means for detecting changes in the position or power of the light beam. The measured changes in the position or power of the light beam can be correlated to changes in the position of the deflectable member to calculate the deflection or change in position of the microstructure. Means for detecting changes in the power of the reflected light beam can be a photodetector, or other detecting device that measures the relative power or intensity of the reflected light beam.

In yet another aspect of the invention, an array of integrated optical sensing elements can be arranged to provide two-dimensional imaging. A single light source can generate an incident light beam along an integrated optical circuit, where the light beam splits into attenuated light beams supplying each integrated optical sensing element. The attenuated light beams can then be used to measure or detect the change in position or deflection of a deflectable member in each integrated optical sensing element.

That the invention improves over the drawbacks of the prior art and accomplishes the advantages described above will become apparent from the following detailed description of the exemplary embodiments and the appended drawings and claims.

DETAILED DESCRIPTION OF DISCLOSED EMBODIMENTS

Figure 1:
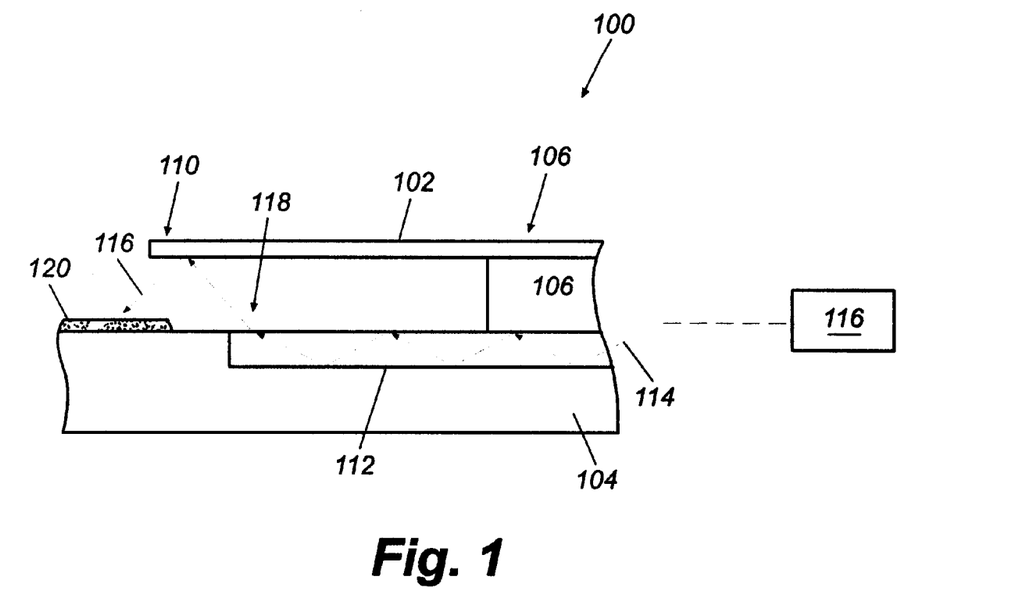
FIG. 1 is a sectional view of an integrated optical sensing element according to a first embodiment of the present invention.

Referring now to the drawings, in which like numerals indicate like elements throughout the several views, FIG. 1 illustrates a sectional view of a first embodiment of an integrated optical sensing element 100. The integrated optical sensing element 100 is a deflectable member such as a microcantilever 102 extended over a substrate 104. One end 106 of the microcantilever 102 mounts to the substrate 104 from a base 108, so that the microcantilever 102 is supported from the base 108. The opposing end 110 of the microcantilever 102 remains freely suspended over the substrate 104.

The microcantilever 102 and the substrate 104 can be fabricated from materials such as silicon, silicon nitride, other semiconductors, or other similar materials or combinations thereof. Microstructures similar to a microcantilever 102 can be used in accordance with the present invention including, but not limited to, microbridge structures, microplates, and any other microstructure that can be configured to deflect in response to a change. Microstructures can be configured to deflect in a variety of circumstances. For example, a chemical coating can be applied to a microcantilever to attract certain chemicals. In the presence of specific chemicals, the coating of the microcantilever will undergo dimensional changes, creating a "bimaterial" effect which causes the microcantilever to deflect in response to the chemical attraction forces. In another example, microstructures can be coated with metallic or chemical coatings which undergo dimensional changes so that the microstructure deflects in the presence of property changes, such as electrical, thermal, acceleration, or other properties.

A waveguide such as an optical waveguide 112 is embedded or buried in the substrate 104 beneath the length of the microcantilever 102. The optical waveguide 112 transmits a light beam 114 from one end to the opposing end of the optical waveguide 112. In the disclosed embodiment the optical waveguide is a conventional single mode optical waveguide with a nominal core diameter of approximately 50 $\mu$m. Other types of waveguides can be used for an integrated optical sensing element 100 including, but not limited to, conventional circuitry for integrated optical circuits (IOC) or other materials or methods for modifying the index of refraction inside a base material so that a light beam can be directed inside a path through the base material. A waveguide or optical waveguide for an integrated optical sensing element 100 may have a circular, rectangular, semicircular, or other similar shaped cross-section.

A light source such as a diode laser 116 is positioned at one end of the optical waveguide 112 to direct an incident light beam 114 down the optical waveguide 112. Other similar light sources can be used to generate a light beam including, but not limited to, a conventional light emitting diode (LED).

A grated exit surface 118 is provided at the opposing end of the optical waveguide 112. The optical waveguide is oriented to direct a light beam 114 towards the microcantilever 102. The grated exit surface 118 is designed to couple or decouple any divergent light beams from the end of the optical waveguide 112, as well as to focus and collimate any divergent light beams into a parallel series of the light beams onto the microcantilever 102.

The grated exit surface 118 can be machined into the end of the optical waveguide 112 or otherwise mounted to the end of the optical waveguide 112. A suitable grated exit surface 118 can be etched into the end of the optical waveguide 112 using conventional focused ion beam miling to create submicron sized features. Another suitable manufacturing technique to create a grated exit surface 118 is by using a laser beam holographic interference in a photoresistant coating on the optical waveguide 112, and then etching the coating by conventional means. Other suitable manufacturing methods such as lithography or other two-dimensional techniques can be used to make a grated exit surface 118 as long as the resultant surface can sufficiently couple or decouple the light beam 114, as well as sufficiently focus and collimate the light beam 114 onto the microcantilever 102.

The end 110 of the microcantilever 102 deflects adjacent to or proximate to the end of the optical waveguide 112 where the light beam 114 leaves the grating exit surface 118. The light beam 114 is directed from the grating exit surface 118 towards the bottom side of the end 110 of the microcantilever 102. The bottom side of the end 110 of the microcantilever 102 should be sufficiently reflective to direct the light beam 114 from the end of the microcantilever 102. A reflective coating can be applied to the end of the microcantilever 102, or a reflecting device can be mounted to the end of the microcantilever 102 to reflect the light beam 114 away from the end of the microcantilever 102.

A photodetector 120 is positioned on the substrate 104 to receive the light beam 114 reflected from the end 110 of the microcantilever 102. The photodetector 120 provides a means for measuring the extent of position change or deflection of the microcantilever 102 by receiving the light beam 114 reflected from the end of the microcantilever 102. Photons from the reflected light beam 114 are converted by the photodetector 120 into an electrical current. Changes in the deflection of the microcantilever 102 are directly proportional to the relative power or intensity of the reflected light beam 114 received by the photodetector 120. Thus, the output electrical current of the photodetector 120 is proportional to the magnitude of deflection of the microcantilever 102. Changes in the relative power or intensity of the reflected light beam 114 are then correlated to a position change or deflection measurement for the microcantilever 102.

A suitable photodetector 120 is a dual-element position-sensitive photodetector using germanium (Ge) or indium gallium arsenide (InGaAs). Other types of photodetectors or similar types of monitoring or detecting devices can be used for receiving a light beam and detecting changes in the relative power or intensity of the reflected light beam such as a quad-element photodetector or conventional charge-coupled device (CCD) chip.

To detect or measure the change in position or deflection of a microcantilever 102 using an integrated optical sensing element 100, a light beam 114 is generated at one end of the optical waveguide 112 by the diode laser 116. The light beam 114 travels down the optical waveguide 112 to the grating exit surface 118 at the opposing end of the optical waveguide 112. The grating exit surface 118 focuses the light beam 114 onto the bottom side of the end 110 of the microcantilever 102 adjacent to the grating surface 118. The light beam 114 is reflected from the end of the microcantilever 102 onto the photodetector 120 mounted on the substrate 104. The light beam 114 received by the photodetector 120 is converted to an output electrical current which can be correlated to the changes in the position or deflection of the microcantilever 102.

When the microcantilever 102 deflects, the light beam 114 is reflected at different angles from the end of the microcantilever 102. The changes in the reflected light beam 114 are received by the photodetector 120, and a different output electrical current is generated by the photodetector 120. Changes in position or deflection of the microcantilever 102 are then correlated with the measured changes in the relative power or intensity of the reflected light beam 114 received by the photodetector 120.

Certain thin microstructures may not permit the integration of an optical waveguide into the microstructure. For example, thin microstructures such as a micropressure transducer diaphragm or an accelerometer may have a layer thickness of 2 $\mu$m or less. In these cases, the optical waveguide can be integrated into the substrate of the microsensor instead of the microstructure itself. Response of the microsensor is dependent upon the width and thickness of the microstructure sensing element. By integrating the waveguide into the substrate of the microsensor instead of the microstructure sensing element, the response and measurement sensitivity of the present invention can be optimized.

This embodiment provides a method and apparatus for independently optimizing measurement of the microdevice as well as the measurement system. By separating the structures of the microdevice and the measurement system, the apparatus can be fine-tuned for optimum measurement.

As will be appreciated by those skilled in the art, the detection and measurement sensitivity of an integrated optical sensing element 100 is dependent upon the geometry of the microsensor. The sensitivity z can be determined from $$z = \frac{1}{2}\frac{\Delta i}{i}\frac{D}{h}L$$

where, $$\frac{\Delta i}{i} = 1.3 \times 10^{-6}$$

and D is the displacement of the reflected light beam, L is the length of the deflectable member, and h is the height of the deflectable member above the optical waveguide.

Figure 2:
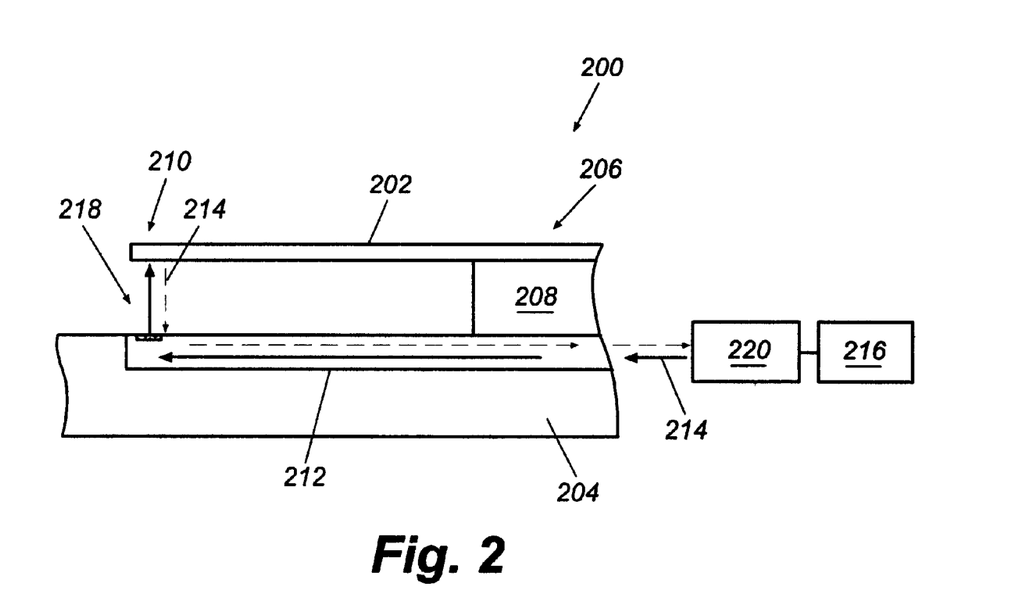
FIG. 2 is a sectional view of an integrated optical sensing element according to a second embodiment of the present invention.

FIG. 2 illustrates a sectional view of a second embodiment of an integrated optical sensing element 200. The integrated optical sensing element 200 is a deflectable member such as a microcantilever 202 extended over a substrate 204. One end 206 of the microcantilever 202 mounts to the substrate 204 from a base 208, so that the microcantilever 202 is supported from the base 208. The opposing end 210 of the microcantilever 202 remains freely suspended over the substrate 204.

The microcantilever 202 and substrate 204 can be fabricated from materials such as silicon, silicon nitride, other semiconductors, or other similar materials or combinations thereof. Microstructures similar to a microcantilever 202 can be used in accordance with the present invention including, but not limited to, microbridge structures, microplates, and any other microstructure that can be configured to reflect in response to a change. For example, a suitable microstructure for an atomic force microscope (AFM) is a microcantilever with a nominal width of approximately 50 $\mu$m at the base and approximately 75 $\mu$m tall.

A waveguide such as an optical waveguide 212 is embedded or buried in the substrate 204 beneath the length of the microcantilever 202. The optical waveguide 212 transmits a light beam 214 from one end of the optical waveguide 212 to the other. For example, a suitable waveguide can be a single mode cladded optical waveguide with a nominal core diameter of approximately 50 $\mu$m. Another suitable waveguide can be a multiple mode optical waveguide with a nominal core diameter of approximately 6–7 $\mu$m. Other similar types of waveguides can be used as for an integrated optical sensing element 200 including, but not limited to, conventional circuitry for integrated optical circuits (IOC) or other materials or methods for modifying the index of refraction inside a base material so that a light beam can be directed inside a path through the base material.

A light source such as a diode laser 216, is positioned at one end of the optical waveguide 212 to generate an incident beam of light 214 down the length of the optical waveguide 212. For example, the light beam 214 from a diode laser 216 for a single mode optical waveguide can be a single wavelength of approximately 1300 μm.

A grated exit surface 218 is positioned at the opposing end of the optical waveguide 212 to permit a light beam 214 in the optical waveguide 212 to reflect from the end of the optical waveguide 212 towards the microcantilever 202. The grated exit surface 218 is designed to couple or decouple any divergent light beams from the end of the optical waveguide 212, as well as to focus and collimate any divergent light beams 214 into a parallel series of the light beams 214 onto the microcantilever 202.

A suitable grated exit surface 218 can be etched into the end of the optical waveguide 212 using conventional focused ion beam milling to create submicron sized features. For example, dimensions of a suitable grated exit surface fabricated on to the end of an optical waveguide can have a grating period of approximately 1 μm and a blaze angle of approximately 45 degrees. Another suitable manufacturing technique to create a grated exit surface 218 is by using a laser beam holographic interference in a photoresistant coating on a waveguide, and then etching the coating by conventional means. Other suitable manufacturing methods such as lithography or other two-dimensional techniques can be used to make a grated exit surface 218 as long as the resultant surface can sufficiently couple or decouple the light beam 214, as well as sufficiently focus and collimate the light beam 214 onto the microcantilever 202.

The end 210 of the microcantilever 202 deflects adjacent to or proximate to the end of the optical waveguide 212 where the light beam 214 leaves the grating exit surface 218. The light beam 214 is directed from the grating exit surface 218 towards the bottom side of the end 210 of the microcantilever 202. The bottom side of the end 210 of the microcantilever 202 should be sufficiently reflective to direct the light beam 214 from the end of the microcantilever 202 back into the grating exit surface 218. A reflective coating can be applied to the end of the microcantilever 202, or a reflecting device can be mounted to the end of the microcantilever 202 to reflect the light beam 214 away from the end of the microcantilever 202.

Means for measuring the extent of position change or deflection of the deflectable member by receiving the light beam from the deflectable member, such as an interferometer 220, is positioned to receive the light beam 214 reflected back from the end 210 of the microcantilever 202 and down the length of the optical waveguide 212. The interferometer 220 receives the reflected light beam 214 from the end of the microcantilever beam 208, and measures the changes in the distance and displacement of the reflected light beam 214. Changes in the deflection of the microcantilever 202 are directly proportional to the changes in distance and displacement of the reflected light beam 214 received by the interferometer 220. Many types of other measurement devices can be used to determine the changes in distance and displacement of the reflected light beams, thus deriving a measurement of the microcantilever 202 deflection.

To detect or measure the change in position or deflection of the microcantilever 202 in the integrated optical sensing element 200, a light beam 214 is generated at one end of the optical waveguide 212 by the diode laser 216 and transmitted down the length of the optical waveguide 212. The light beam 214 travels down the optical waveguide 212 towards the grating exit surface 218 at the opposing end of the optical waveguide 212. The grating exit surface 218 focuses the light beam 214 onto the bottom side of the end 210 of the microcantilever 202 adjacent to the grating surface 218.

The light beam 214 reflects from the end of the microcantilever 202 back into the grating exit surface 218 at the end of the optical waveguide 212. The grating exit surface 218 focuses the reflected light beam 214 back to the other end of the optical waveguide 212. The interferometer 220 receives the reflected light beam 214. The interferometer 220 measures the distance and displacement of the reflected light beam 214, and the distance and displacement of the reflected light beam is then correlated with the position of the microcantilever 202.

When the microcantilever 202 deflects, the light beam 214 reflects at different angles from the end of the microcantilever 202. The reflected light beam 214 received by the grating exit surface 218 of the optical waveguide 212 is focused back along the optical waveguide 212 towards the interferometer 220. Changes in the distance and displacement of the reflected light beam 214 compared with the initial distance and displacement of the light beam 214 correlates to changes in position or deflection of the microcantilever 202.

For example, for the displacement of a microcantilever in an atomic force microscope (AFM) during an acoustic excitation of approximately 7.5 kHz, the measured output of a fiber interferometer is 3 mV/nm with a resolution greater than 1 nm. Improved resolution could be achieved by using a more sensitive detecting device such as a photomultiplier tube, and by using shorter or multiple wavelength. Single or multiple wavelength interferometry can be used with this embodiment to determine microcantilever positioning to sub-nanometer accuracy. Using multiple wavelength interferometry, phase ambiguities associated with single wavelength interferometry can be removed from the output display. Additional reference points are provided by the multiple wavelengths, thus providing improved accuracy.

Modifications of this embodiment 200 may be required for thin microstructures that do not permit the integration of an optical waveguide into the microsensor. For example, thin microstructures are often fabricated with a layer thickness of 2 μm or less, including a micropressure transducer diaphragm, an accelerometer, or other types of thin microstructures. In these cases, the invention can be integrated into the substrate of the microsensor instead of the microstructure itself. Response of the microsensor is dependent upon the width and thickness of the microstructure sensing element. By integrating the waveguide into the substrate of the microsensor, the response and measurement sensitivity of the present invention can be optimized.

Similar to the embodiment of FIG. 1, this embodiment provides a method and apparatus for independently optimizing measurement of the microdevice as well as the measurement system. By separating the structures of the microdevice and the measurement system, the apparatus can be fine-tuned for optimum measurement.

Figure 3:
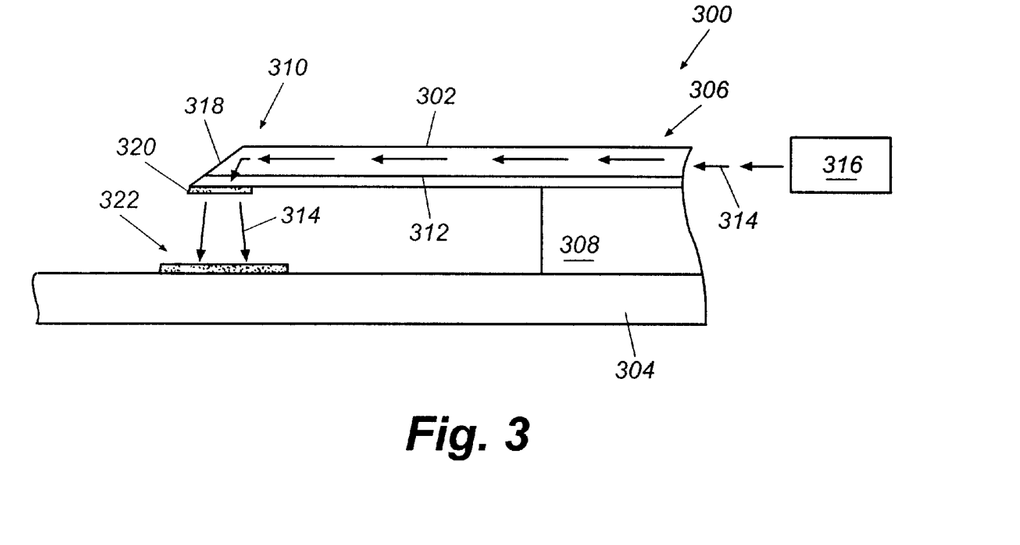
FIG. 3 is a sectional view of an integrated optical sensing element according to a third embodiment of the present invention.

FIG. 3 illustrates a sectional view of a third embodiment of an integrated optical sensing element 300. The integrated optical sensing element 300 is a deflectable member such as a microcantilever 302 extended over a substrate 304. One end 306 of the microcantilever 302 mounts to the substrate 304 from a base 308, so that the microcantilever 302 is supported from the base 308. The opposing end 310 of the microcantilever 302 remains freely suspended over the substrate 304.

The microcantilever 302 and the substrate 304 can be fabricated from materials such as silicon, silicon nitride, other semiconductors, or other similar materials or combinations thereof. Microstructures similar to a microcantilever 302 can be used in accordance with the present invention including, but not limited to, microbridge structures, microplates, and any other microstructure that can be configured to reflect in response to a change.

A waveguide such as an optical waveguide 312 is embedded within the length of the microcantilever 302. The optical waveguide 312 permits a light beam 314 to be transmitted from one end to the opposing end of the optical waveguide. For example, a suitable waveguide can be a single mode optical waveguide with a nominal core diameter of approximately 50 $\mu$m. Another suitable waveguide can be a multimode optical waveguide with a nominal core diameter of approximately 6–7 $\mu$m. Other similar types of optical waveguides can be used for an integrated optical sensing element 300 including, but not limited to, conventional circuitry for integrated optical circuits (IOC) or other materials or methods for modifying the index of refraction inside a base material so that light is directed inside a path through the base material.

A light source such as a diode laser 316 is positioned at one end of the optical waveguide 312 to generate an incident beam of light 314 through the length of the optical waveguide 312. Other similar light sources can be used to generate a light beam including, but not limited to, a conventional light emitting diode (LED).

An angled steering surface 318 positioned at the end 310 of the microcantilever 302 deflects the light beam travelling towards the end 310 of the microcantilever 302 downward from the end 310 of the microcantilever 302. The steering surface 318 can be etched into the end 310 of the optical waveguide 312 or otherwise attached to the end 310 of the microcantilever 302 to deflect the light beam 314 from the optical waveguide 312 towards the microstructure 304.

A collimating surface 320 or an exit grating surface as described in FIGS. 1–2 can be positioned at the end of the optical waveguide 312 on the bottom surface of the microcantilever 302 to receive the light beam 314 reflected from the angled steering surface 318. The light beam 314 passes through the collimating surface 320 which collimates divergent light beams into a series of parallel paths downward from the end of the microcantilever 302. The angle of incidence of the light beam 314 received by the collimating surface 320 is less than the angle of incidence required for internal reflection back into optical waveguide 312, thus the light beam 314 passes through the collimating surface 320 and exits the optical waveguide 312. Manufacturing processes to fabricate a suitable collimating surface include, but are not limited to, focused ion beam milling, holographic interference of a laser beam in a photoresistant coating on the waveguide, etching, lithography, and other two-dimensional techniques.

One skilled in the art will recognize that the present invention can be configured with either the angled steering surface 318 or the collimating surface 320 at the end of the optical waveguide 312, or both the angled steering surface 318 and collimating surface 320 at the end of the optical waveguide 312. With any combination of the angled steering surface 318 and the collimating surface 320, the light beam 314 reflects downward from the end 310 of the microcantilever 302.

Means for measuring the extent of position change or deflection of the deflectable member by receiving the light beam from the deflectable member, such as a dual-element position-sensitive photodetector 322, can be positioned on the substrate 304 proximate to and beneath the end 310 of the microcantilever 302 to receive a deflected light beam 314 from the end of the optical waveguide 312. Photons from the received light beam 314 are measured by the photodetector 322, and are converted into an output electrical current. Changes in the output electrical current of the photodetector 322 can then be correlated to changes in the position or deflection of the microcantilever 302.

A suitable photodetector 320 is a dual-element position-sensitive photodetector using germanium (Ge) or indium gallium arsenide (InGaAs). Other types of photodetectors or similar types of detecting devices can be used for receiving light beam and detecting changes in the relative power or intensity of the reflected light beam such as a quad-element photodetector or conventional charge-coupled device (CCD) chip.

To detect or measure the change in position or deflection of the microcantilever 302 in the integrated optical sensing element 300, a light beam 314 is generated at one end of the optical waveguide 312 by the diode laser 316. The light beam 314 is transmitted through the optical waveguide 312 to the angled steering surface 318 at the opposing end of the optical waveguide 312. The angled steering surface 318 focuses the light beam 314 onto a collimating surface 320 on the bottom side of the end 310 of the microcantilever 302. The light beam 314 is reflected from the collimating surface 320 onto the photodetector 322 mounted on the substrate 304. The photodetector 322 converts the received light beam 314 into an output electrical current which can be correlated to the changes in the position or deflection of the microcantilever 302.

When the microcantilever 302 deflects, the light beam 314 is reflected at different angles from the end 310 of the microcantilever 302. When the light beam 314 are reflects at different angles from the angled steering surface 318, changes in the relative intensity and power of the light beam 314 received by the photodetector 320 can be measured. The changes in the relative intensity and power of the light beam 314 is measured as a different output electrical current generated by the photodetector 320. Displacement or deflection of the microcantilever 302 can be correlated with the different output currents that are based upon measured changes in the relative intensity and power of the reflected light beam 314 received by the photodetector 320.

This embodiment is constructed for relatively thicker microstructures that permit the integration of an optical waveguide into an integrated optical sensing element. In the first two embodiments for relatively thin microstructures, the optical waveguide has been embedded in the substrate of the integrated optical sensing element. In this embodiment, the integrated optical sensing array element 300 is constructed with an optical waveguide 312 embedded within the microcantilever 302.

Figure 4:
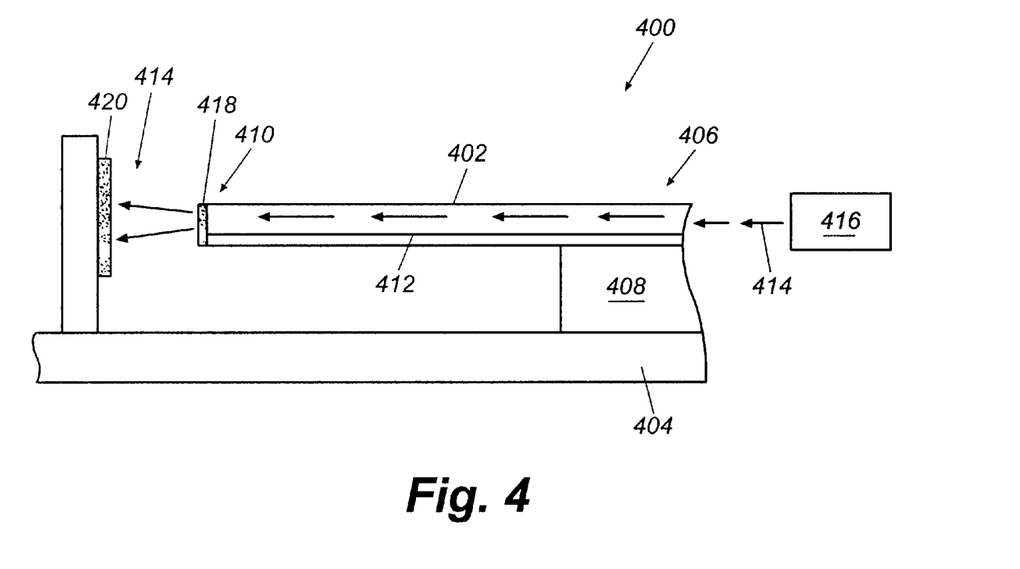
FIG. 4 is a sectional view of an integrated optical sensing element according to a fourth embodiment of the present invention.

FIG. 4 illustrates a sectional view of a fourth embodiment of an integrated optical sensing element. The integrated optical sensing element 400 is a deflectable member such as a microcantilever 402 extended over a substrate 404. One end 406 of the microcantilever 402 mounts to the substrate 404 from a base 408, so that the microcantilever 402 is supported from the base 408. The opposing end 410 of the microcantilever 402 remains freely suspended over the substrate 404.

The microcantilever 402 and substrate 404 can be fabricated from materials such as silicon, silicon nitride, other semiconductors, or other similar materials or combinations thereof. Microstructures similar to a microcantilever 402 can be used in accordance with the present invention including, but not limited to, microbridge structures, microplates, and any other microstructure that can be configured to reflect in response to a change.

A waveguide such as an optical waveguide 412 is embedded within the length of the microcantilever 402. The optical waveguide 412 transmits a light beam 414 from one end to the opposing end of the optical waveguide 412. For example, a suitable waveguide can be a single mode optical waveguide with a nominal core diameter of approximately 50 µm. Another suitable waveguide can be a multimode optical waveguide with a nominal core diameter of approximately 6–7 µm. Other similar types of waveguides can be used as for an integrated optical sensing element 400 including, but not limited to, conventional circuitry for integrated optical circuits (IOC) or other materials or methods for modifying the index of refraction inside a base material so that light is directed inside a path through the base material.

A light source such as a diode laser 416 is positioned at one end of the optical waveguide 412 to generate an incident beam of light 414 through the length of the optical waveguide 412. Other similar light sources can be used to generate a light beam including, but not limited to, a conventional light emitting diode (LED).

A collimating surface 418 or an exit grating surface, similar to those described in FIGS. 1–3 can be positioned at the end of the optical waveguide 412 at the end 410 of the microcantilever 402 to receive the light beam 414. The light beam 414 passes through the collimating surface 418 which collimates divergent light beams into a one or more parallel paths outward from the end 410 of the microcantilever 402. The angle of incidence of the light beam 414 received by the collimating surface 418 is less than the angle of incidence required for internal reflection back into optical waveguide 412, thus the light beam 414 passes through the collimating surface 418 and exits the optical waveguide 412. Manufacturing processes to fabricate a suitable collimating surface include, but are not limited to, focused ion beam milling, holographic interference of a laser beam in a photoresistant coating on the waveguide, etching, lithography, and other two-dimensional techniques.

Means for measuring the extent of position change or deflection of the deflectable member by receiving the light beam from the deflectable member, such as a dual-element position-sensitive photodetector 420, is positioned perpendicular to the end 410 of the microcantilever 402 to receive a light beam 414 from the end of the optical waveguide 412. Photons from the received light beam 414 are measured by the photodetector 420, and are converted into an output electrical current. Changes in the output electrical current of the photodetector 420 can then be correlated to changes in the position or deflection of the microcantilever 402.

A suitable photodetector 420 can be a dual-element, position-sensitive photodetector using germanium (Ge) or indium gallium arsenide (InGaAs). Other types of photodetectors or similar types of detecting devices can be used for receiving light beam and detecting changes in the relative power or intensity of the reflected light beam such as a quad-element photodetector or conventional charge-coupled device (CCD) chip.

To detect or measure the change in position or deflection of the microcantilever 402 in the integrated optical sensing element 400, a light beam 414 is generated at one end of the optical waveguide 412 by the diode laser 416. The light beam 414 is transmitted down the length of the optical waveguide 412 to the collimating surface 418 at the opposing end of the optical waveguide 412. The collimating surface 418 focuses the light beam 414 outward from the end 410 of the microcantilever 402. The light beam 414 reflects from the collimating surface 418 onto the photodetector 420 mounted perpendicular to the microcantilever 402. The photodetector 420 converts the received light beam 414 into an output electrical current which can be correlated to the changes in the position or deflection of the microcantilever 402.

When the microcantilever 402 deflects, the light beam 414 reflects at different angles from the end 410 of the microcantilever 402. When the light beam 414 reflects from the collimating surface 418, changes in the relative intensity and power of the light beam 414 are received by the photodetector 420. The changes in the relative intensity and power of the light beam 414 are measured as different output electrical currents generated by the photodetector 420. Changes in position or deflection of the microcantilever 402 can then be correlated with the different output currents.

Similar to the third embodiment, this embodiment is constructed for relatively thicker microstructures that permit the integration of a waveguide into a deflectable member for an integrated optical sensing element. In the first two embodiments for relatively thin microstructures, the optical waveguide has been embedded in the substrate of the integrated optical sensing element 400. In this embodiment, an optical waveguide 412 is embedded into the microcantilever 402 of the integrated optical sensing element 400.

A plurality of deflectable members can be arranged in a one or two-dimensional matrix and integrated into a single microstructure for a variety of sensing or imaging purposes or applications. For example, a plurality of deflectable members can be arranged in a matrix for sensing and imaging in an infrared spectrometer detector.

Figure 5:
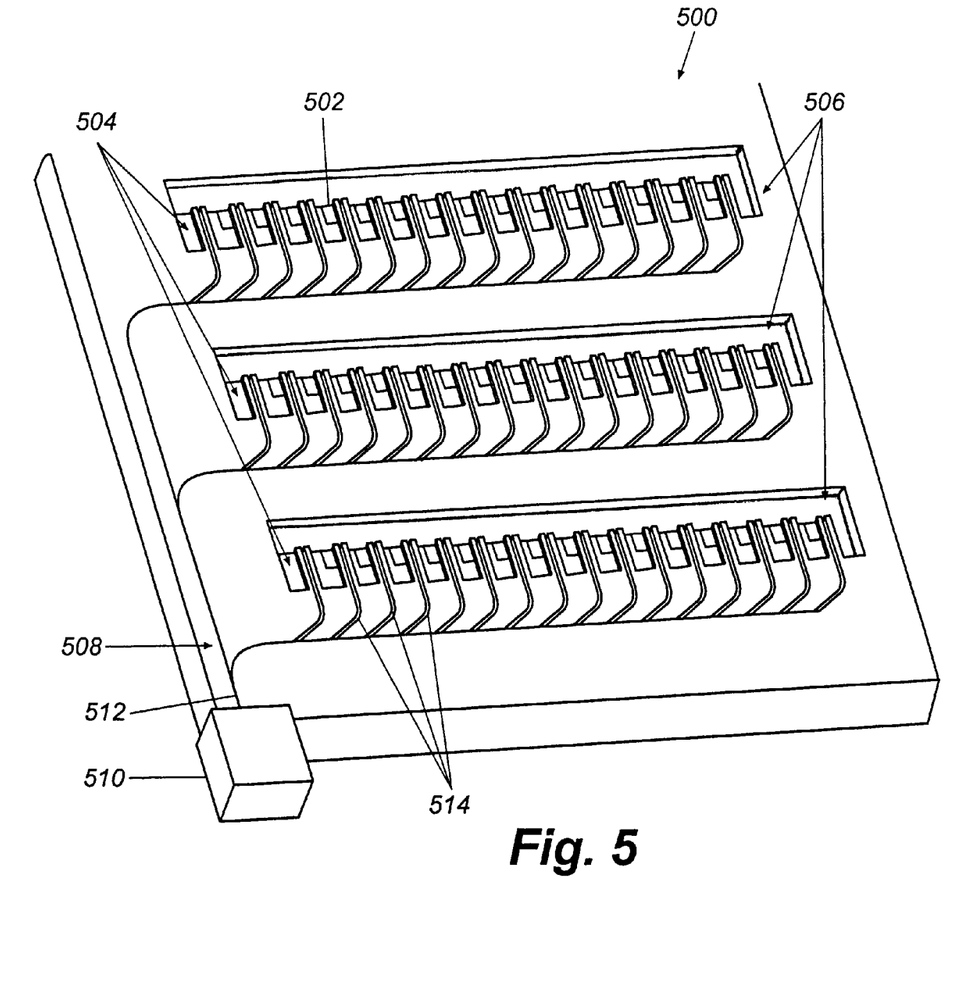
FIG. 5 is a perspective view of an array of any of the integrated optical sensing elements of FIGS. 1–4.
Figure 6:
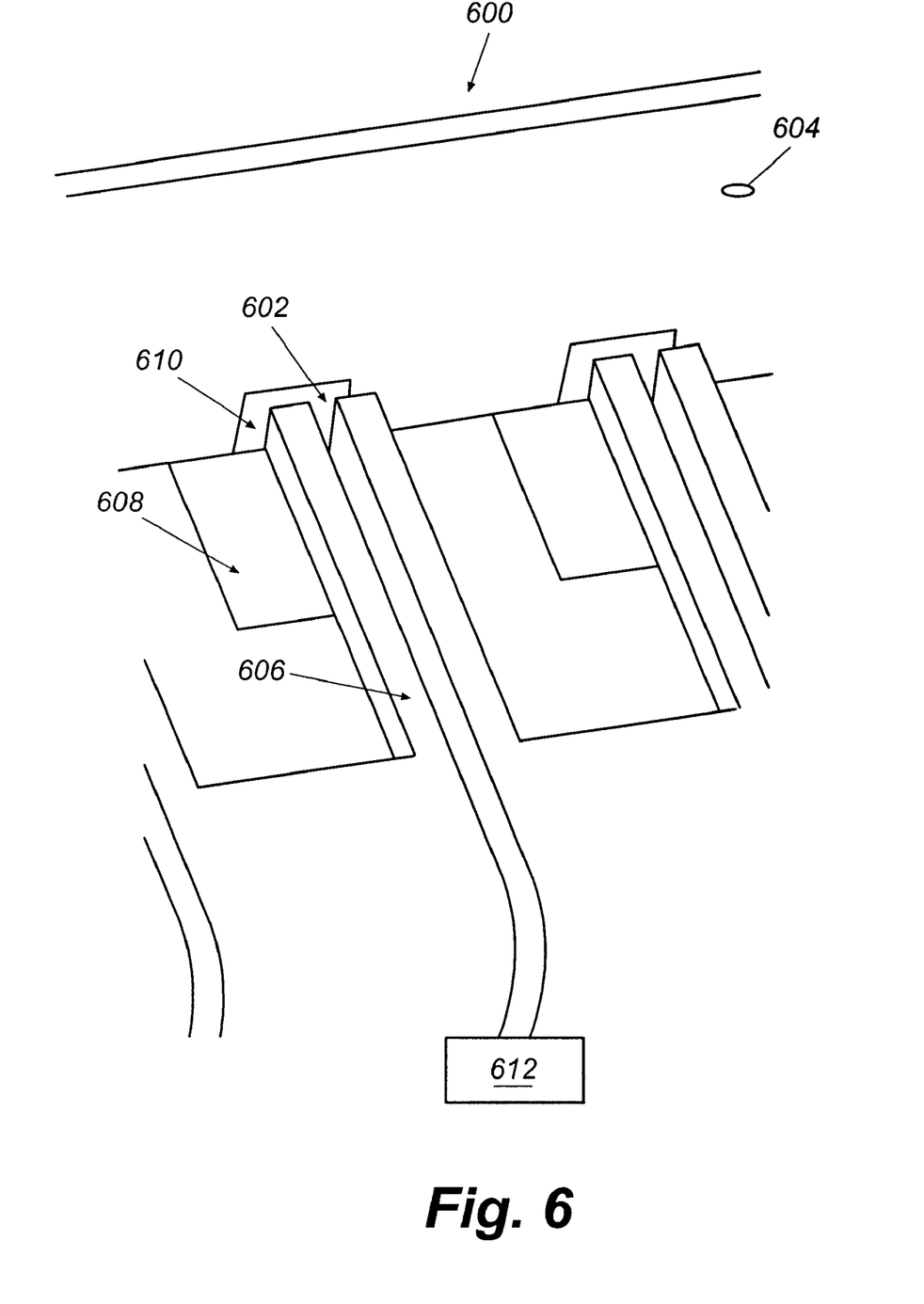
FIG. 6 is a detailed view of an integrated optical sensing element used in FIG. 5.

FIG. 5 illustrates a perspective view of an array of integrated optical sensing elements. FIG. 6 illustrates a detailed view of an individual integrated optical sensing element used in the array of FIG. 5. An array 500 of integrated optical sensing elements 502 is used in conjunction with any of the embodiments of integrated optical sensing elements previously shown and described in FIGS. 1–4. The integrated optical sensing elements 502 are positioned into three array rows 504 of sixteen individual sensing elements 502 on a substrate 506. An integrated optical circuit (IOC) 508 interconnects to each sensing element 502 and connects back to a conventional diode laser 510. The integrated optical circuit 508 has a main trunk 512 connected to the diode laser 510. A branch 514 from the trunk 512 connects each integrated optical sensing element 502 to the trunk 512 of the integrated optical circuit 508. The diode laser 510 generates a light beam that travels down the trunk of the integrated optical circuit 508. The light beam splits from the trunk 512 to supply each branch 514 connected to a sensing element 502. The attenuated light beam travels down each branch 514 to the sensing elements 502. One skilled in the art will recognize that a variety of conventional manufacturing techniques can be used to make an integrated optical circuit 508 such that each branch 514 receives a proportional or equal amount of the light beam split from the trunk 512.

When changes in the light beam are detected by the sensing elements 502, these changes are correlated to the changes in the position or deflection of each sensing element 502. The changes are further correlated to changes in the substrate 506. Using these changes, a one or two-dimensional view of changes in the substrate 506 can be constructed.

As shown in FIG. 6, the integrated optical sensing elements 502 of the array 500 in FIG. 5 is an integrated optical sensing element 600. The configuration of the integrated optical sensing element 600 is similar to the integrated optical sensing element shown and described in FIG. 3 as 300. The integrated optical sensing element 600 includes a deflectable member such as microcantilever 602 supported over a substrate 604, a waveguide such as an integrated optical circuit 606 embedded in the length of the microcantilever 602, and means for measuring the extent of position change or deflection of the deflectable member such as a photodetector 608. The photodetector 608 is positioned beneath the end of the microcantilever 602 to receive a light beam 610 from the integrated optical circuit 606.

An incident light beam 610 is generated by a light source such as a diode laser 612 and is transmitted through the integrated optical circuit 508. The light beam 610 splits from the trunk 512 of the integrated optical circuit 508 to supply each branch 514 of the integrated optical circuit 508 connecting to the sensing elements 600. The light beam 610 travels down each branch 514 of the integrated optical circuit 606 to the end of the microcantilever 602. The attenuated light beam 610 from the branch 514 is directed or transmitted from the end of the microcantilever 602 towards the photodetector 608. The photodetector 608 measures or detects the relative intensity or power of the light beam 610 by generating an output electrical current in response to the light beam 610. The output electrical current is correlated to the change in position or deflection of the microcantilever 602.

In lieu of the integrated optical circuit (IOC) 508 interconnecting each sensing element 502 to a conventional diode laser 510, the waveguide for a one or two-dimensional matrix of microstructures can comprise a bundle of discrete optical waveguides, all of which lead from a single light source to an individual microstructure, or a single optical waveguide trunk having a plurality of branch fibers each of which leads from the trunk to an individual microstructure. Regardless of the specific waveguide used, all provide an important advantage. That is, in addition to transmitting light to the individual microstructures, the waveguides also split a single incident light beam from a single light source into a plurality of discrete light beams, one for each microstructure. In this manner the advantages of an integrated optical sensing element are not negated by the size, weight, or expense of a separate light source for each sensing element.

The invention provides a very sensitive, integrated apparatus and method for detecting and measuring the position and deflection of microstructures. The microstructures and techniques described herein can be applied to other microsensors for micro-electro-mechanical systems (MEMS) and micro-opto-electro-mechanical systems (MOEMS) including, but not limited to, accelerometers, uncooled infrared detectors, chemical sensing devices, diaphragms, pressure or flow sensors, military safing and arming systems, and any other device that requires precise position or deflection measurement. Waveguides or optical waveguides can be fabricated as a part of the microsensor or as a modular subcomponent of a microdevice such that a single diode laser beam can direct a light beam to a large array of microsensors. One or two-dimensional views of changes in a substrate can be obtained by employing an array of microsensors onto the substrate. An apparatus or system constructed in accordance with the present invention is capable of angstrom or sub-angstrom resolution.

While the foregoing embodiment has been disclosed with respect to a device wherein the integrated optical sensing element is shaped as a microcantilever, it will be understood that an integrated optical sensing element can be made out of substrate materials in different shapes that will deform in response to photo, thermal, chemical, acceleration, or other induced stresses. Such alternate shapes include, but are not limited to, microbridges, microplates, and pressure sensing diaphragms, or any other microstructure in which the measurement or detection of displacement is needed. Other materials can be used to manufacture or design an integrated optical sensing element like silicon, silicon nitride, other semiconductors, or other similar materials or combinations thereof. Furthermore, conventional methods can be used to manufacture an integrated optical sensing element from microelectronic materials, including specialized silicon etch processes, lithographic techniques, and other two-dimensional methods.

In view of the foregoing, it will be appreciated that the invention provides an integrated optical sensing element for detecting and measuring changes in position or displacement of a microstructure. It should be understood that the foregoing relates only to the exemplary embodiments of the present invention, and that numerous changes may be made therein without departing from the spirit and scope of the invention as defined by the following claims.

The invention claimed is:

1. A sensor for detecting changes in position or deflection, comprising:

a deflectable member for receiving a light beam;

a waveguide disposed to reflect the light beam and arranged for redirecting the light beam in response to deflection of the deflectable member; and means for measuring the extent of position change or deflection of the deflectable member by receiving the light beam from the deflectable member.

2. The sensor of claim 1, wherein the deflectable member comprises a diaphragm.

3. An apparatus comprising a plurality of sensors according to claim 1 arranged in a one-dimensional array to provide imaging or sensing capability, and further configured for simultaneous interrogation of the plurality of sensors.

4. An apparatus comprising a plurality of sensors according to claim 1 arranged in a two-dimensional array to provide imaging or sensing capability, and further configured for simultaneous interrogation of the plurality of sensors.

5. The sensor of claim 2, wherein means for measuring the extent of position change or deflection of the deflectable member comprises a substrate, and the waveguide is integrated into the substrate.

6. The sensor of claim 1, wherein the deflectable member further comprises a reflective element for directing the light beam towards the means for receiving the light beam from the deflectable member.

7. The sensor of claim 6, wherein the deflectable member further comprises a reflective element to focus and collimate the light beam towards the means for receiving the light beam from the deflectable member.

8. A method of detecting changes in position or deflection of a deflectable member, comprising the steps:

transmitting a light beam through a waveguide operatively associated with the deflectable member so as to deflect when the deflectable member deflects;

monitoring changes to the light beam when the light beam leaves the waveguide, said monitoring step further comprising;

measuring changes in intensity or power of the light beam;

generating an output signal in response to receiving the light beam, variations in the output signal corresponding to changes in position or deflection of the deflectable member; and correlating changes to the light beam to measure position or deflection in the deflectable member.

9. A monolithic microsensor for imaging purposes, comprising:

a plurality of deflectable members;

means for receiving an incident light beam from a light source;

means for splitting said incident light beam into a plurality of attenuated light beams;

means for transmitting each of said plurality of attenuated light beams to a corresponding one of said plurality of deflectable members in such a manner that each of said attenuated light beams is modulated in response to deflection of its associated deflectable member; and means for detecting the modulation of said light beams.

10. A microsensor according to claim 9, wherein said plurality of deflectable members are arranged in a one or two-dimensional matrix, and further configured for simultaneous interrogation of the plurality of sensors.

11. A microsensor according to claim 9, wherein each of said attenuated light beams is modulated in response to deflection of its associated deflectable member by directing each of said attenuated light beams along the axis of its associated deflectable member, whereby when a deflectable member deflects, its axis is displaced, and its associated attenuated light member directed along said axis is modulated.

12. A microsensor according to claim 9, wherein each of said attenuated light beams is modulated in response to deflection of its associated deflectable member by reflecting each of said attenuated light beams off of its associated deflectable member.

13. A microsensor according to claim 12, wherein said means for detecting the modulation of said light beams comprises a photodetector associated with each of said plurality of deflectable members, each of said reflected attenuated light beams being directed onto an associated photodetector.

* * * * *